Figure 1:
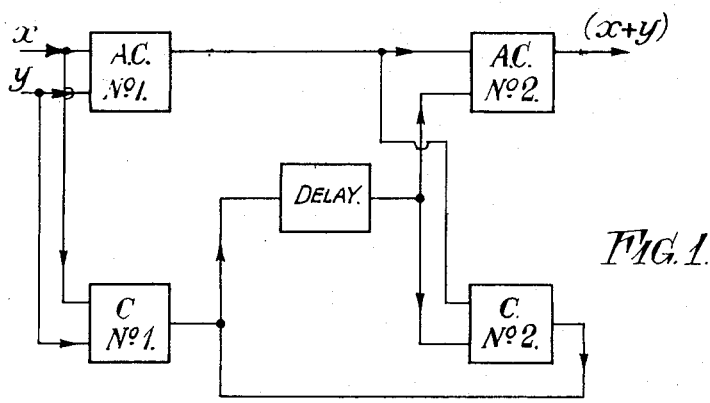

Sept. 16, 1952 W. S. ELLIOTT 2,610,790
DIGITAL CALCULATING MACHINE
Filed March 26, 1951

INVENTOR
WILLIAM SIDNEY ELLIOTT
By Bailey, Stephens & Huettig
ATTORNEYS

Patented Sept. 16, 1952

2,610,790

UNITED STATES PATENT OFFICE 2,610,790

DIGITAL CALCULATING MACHINE

William Sidney Elliott, Borehamwood, England

Application March 26, 1951, Serial No. 217,452
In Great Britain March 28, 1950

5 Claims. (Cl. 235—61)

This invention relates to digital calculating and like logical machines in which information is represented by sequences of pulses each sequence being capable of being interpreted as a number in the binary scale, and is concerned more particularly with those machines in which each sequence of pulses is caused to occur in a single channel with the pulse positions equally spaced in time in inverse order to their place values in the binary number, i. e. with the pulse position corresponding to the lowest place value leading. The interval of time between two successive positions is referred to as "a digit time" and the period of time occupied by a sequence of pulses representing the largest number to be dealt with is referred to as "a number time."

It is the object of the present invention to provide improved adding apparatus for use in such machines which shall perform the operation of combining two such sequences of pulses occurring during the same number time in two different channels to form a third sequence of pulses representing a binary number which is the sum of the binary numbers represented by the first two sequences.

According to the invention, adding apparatus for machines of the character referred to comprises two anti-coincidence units, two coincidence units, a delay unit operative to delay by one digit time any pulse fed thereinto, and pulse channels so inter-connecting the several units that when the two sequences of pulses to be combined are both fed as separate inputs both to the first anti-coincidence unit and to the first coincidence unit, the output from the first anti-coincidence unit will constitute the one input to both the second anti-coincidence unit and the second coincidence unit, the outputs from the first and second coincidence units will constitute the input to the delay unit, the output from the delay unit will constitute the second input to both the second anti-coincidence unit and the second coincidence unit, and the output from the second anti-coincidence unit will yield the desired third sequence of pulses.

In this specification, the term "anti-coincidence unit" means a two-input device or arrangement adapted to product a pulse in its output only when either of its inputs exhibits a pulse and the term "coincidence unit" means a two-input device or arrangement adapted to produce a pulse in its output only when both of its inputs simultaneously exhibit pulses.

Where, as is most commonly the case, the pulses to be dealt with are electrical in nature, for example, voltage pulses, the anti-coincidence and coincidence units preferably are or comprise electronic devices such as thermionic tubes, and the delay unit either may be one of the known delay networks or, as is preferred, may be the delay network forming the subject-matter of the co-pending application Serial No. 217,457 of even date herewith.

The invention will be clearly understood from the following description in which reference is made to the accompanying drawings, wherein—

Figure 2:
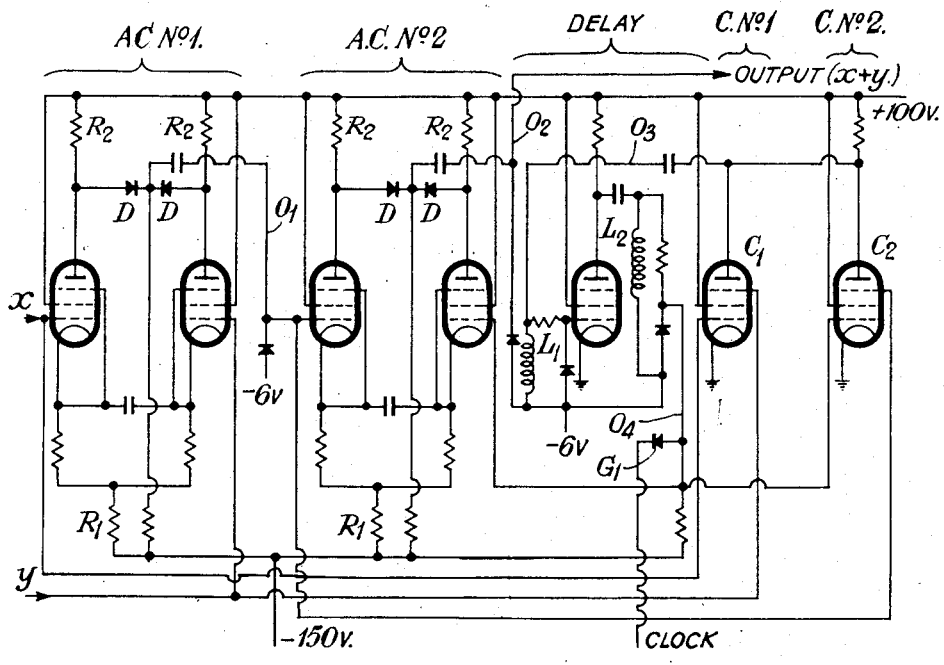

Fig. 1 is a diagram illustrating the broad principle upon which the invention is based, and Fig. 2 is an electrical circuit diagram showing one practical construction of apparatus for carrying the invention into effect, given as an example only.

As can be seen from Fig. 1, the apparatus comprises first and second anti-coincidence units, marked respectively "AC No. 1" and "AC No. 2," first and second coincidence units, marked respectively "C No. 1" and "C No. 2," a delay unit which is marked "Delay," and appropriate pulse channels connecting the several units in the system shown.

One of the two pulse sequences to be added is fed in on the input channel marked $x$ and the other on the input channel marked $y$, the pulse sequence which constitutes the output of the apparatus appearing on the channel, marked $x+y$, which is the output from the unit "AC No. 2."

If no pulses occur at $x$ and $y$, the output $x+y$ also exhibits no pulse. Should there be a pulse at either $x$ or $y$ and no pulse at the other input channel, a pulse will be fed by "AC No. 1" to one input channel of each of the units "AC No. 2" and "C No. 2"; there will be no pulse in the output of "C No. 1"; and, assuming that there is no pulse to come from the delay unit, there will be a pulse in the output $x+y$ but no pulse in the output from "C No. 2."

When a pulse occurs at each of the input channels $x$ and $y$, there will be no pulse in the output of "AC No. 1"; a pulse will be fed by "C No. 1" to the delay unit; and, again assuming that there is no pulse to come from the delay unit, there will be no pulse in the output $x+y$ and no pulse will be fed by "C No. 2" to the delay unit. The pulse fed to the latter by "C No. 1" will appear at the appropriate inputs to "AC No. 2" and "C No. 2" at the next digit time and should there be no pulses at $x$ and at $y$ at this instant there will be delivered at output $x+y$ a further pulse in this next digit time.

Without detailing the several stages, it can be stated that the occurrence of a pulse at each of the input channels $x$ and $y$ in the next digit time to that in which a pulse was fed to the delay unit will result in a pulse in the output $x+y$ and the feeding of a further pulse to the delay unit. Similarly, the other possible occurrences will also yield the appropriate outputs.

Fig. 2 illustrates a circuit which may be utilized with great advantage in carrying the invention into practice in those cases where the pulses are voltage pulses. The input channels are again marked $x$ and $y$ and the output channel is again marked $x+y$.

Those portions which correspond to the blocks in the diagram of Fig. 1 are correspondingly marked in Fig. 2. The two anti-coincidence units follow each other at the left-hand side of the circuit diagram and are then followed by the delay unit which is succeeded by the two coincidence units. In each of the anti-coincidence units the value of the resistance $R_1$ is made very much greater than that of either of the resistances $R_2$ which are equal to each other. The uni-directional conducting devices indicated at D may be diodes or germanium or other suitable crystals. Both the anti-coincidence units operate in a manner which will be clear from a consideration of the circuit details without detailed explanation here. If a pulse is supplied in the input $x$ and no pulse is supplied in the input $y$ to the first anti-coincidence unit a pulse is derived in the output $O_1$ of this unit. The same result is secured if a pulse is supplied at the input $y$ and no pulse is supplied at the input $x$. Should a pulse be supplied at the input $x$ and another at the input $y$ simultaneously, there will be no pulse in the output $O_1$ from this first anti-coincidence unit. As has been said, similar considerations apply to the second anti-coincidence unit, the output of which (marked $O_2$) is also the output from the complete apparatus.

The manner in which the coincidence units function will be clear from a consideration of the circuit illustrated, it being understood that the valves $C_1$ and $C_2$ are short suppressor base pentodes, and it will be seen that there will be no pulse in the common output $O_3$ of these units unless a pulse is delivered by the one or other coincidence unit, and further that neither unit will deliver a pulse unless there is a pulse in each of its two inputs simultaneously. The two inputs to the first coincidence unit are the $x$ and $y$ inputs whereas those for the second coincidence unit are the output from the first anti-coincidence unit and the output $O_4$ of the delay unit. The output $O_4$ from the latter is also supplied as one of the inputs to the second anti-coincidence unit.

The delay unit shown is that which is described in the specification of co-pending application Serial No. 217,457 of even date herewith, and is arranged to cause a delay of one digit time in the passage of any pulse which may be delivered to the delay unit from the output $O_3$ of the coincidence units. Since the delay unit functions due to the inclusion of the inductances $L_1$ and $L_2$ in its input and output sides, respectively, the shape of any pulse which is delivered by the delay unit will have been distorted from the square-topped pulse shape which is normally employed in such circuits. The output from the delay unit is therefore employed to control a gate $G_1$ to which properly shaped pulses are supplied from any well-known clock-pulse generator, so that the effective output from the delay unit will consist of properly shaped pulses.

Provision is made for D. C. restoration at appropriate points in the circuit, as will be appreciated from a consideration of the latter.

What I claim is:

1. An adding unit for a binary digital calculating machine comprising first and second anti-coincidence units, first and second coincidence units, and a delay unit operative to delay by one digit time any pulse fed thereto, a first pulse input channel to each of the first anti-coincidence unit and the first coincidence unit for receiving the first of the two separate pulse sequences to be added, a second pulse input channel to each of the said first anti-coincidence and coincidence units for simultaneously receiving the other of the two pulse sequences, and pulse transmitting channels interconnecting the said units, as follows: a channel connecting the output from the first anti-coincidence unit to the one inputs of both the second anti-coincidence unit and the second coincidence unit; a channel connecting the output of each of the first and second coincidence units to the delay unit; a channel connecting the output from the delay unit to each of the other inputs of the second anti-coincidence and coincidence units; and a resultant output channel from the second anti-coincidence unit.

2. In an adding unit as claimed in claim 1, an anti-coincidence unit comprising a pair of similar multi-electrode thermionic tubes each having a control grid constituting a respective input to the unit, a pair of equal resistances constituting respectively the anode loads of the tubes, and a pair of unidirectional conducting devices similarly connected between the respective anodes and a common output channel.

3. An anti-coincidence unit as claimed in claim 2, wherein the cathode circuits of the two tubes are commoned and the said common circuit includes a resistance whose value is large compared with that of the anode load resistances.

4. In an adding unit as claimed in claim 1, a coincidence unit comprising a thermionic tube having at least two grids, each of said constituting a pulse input to the unit.

5. In an adding unit as claimed in claim 1, a pair of coincidence units each comprising a thermionic tube having at least two grids constituting the inputs to the unit, a common anode load resistance for both tubes, and a common output channel from the anode of both tubes.

WILLIAM SIDNEY ELLIOTT.

No references cited.